United States Patent [19]

Lang

[11] 4,354,555
[45] Oct. 19, 1982

[54] HYDRAULIC LIFTING ARRANGEMENT FOR IMPLEMENTS, ESPECIALLY ON TRACTORS

[75] Inventor: Armin Lang, Schwaebisch Gmuend, Fed. Rep. of Germany

[73] Assignee: Zahnradfabrik Friedrichshafen, AG., Friedrichshafen, Fed. Rep. of Germany

[21] Appl. No.: 197,946

[22] Filed: Oct. 17, 1980

[30] Foreign Application Priority Data

Oct. 31, 1979 [DE] Fed. Rep. of Germany ....... 2943994

[51] Int. Cl.³ .......................................... A01B 63/114
[52] U.S. Cl. ......................................... 172/4; 91/48; 91/388; 91/452
[58] Field of Search .................. 172/2, 3, 4, 5, 7, 9; 56/10.2, 10.4; 280/405 B, 446 R, 446 A; 37/DIG. 1; 91/47, 48, 388, 452

[56] References Cited

U.S. PATENT DOCUMENTS 2,811,016 10/1957 McRae ............................... 91/48 X

FOREIGN PATENT DOCUMENTS

| | | |
|---|---|---|
| 1115978 | 10/1961 | Fed. Rep. of Germany .......... 172/4 |
| 2346843 | 3/1975 | Fed. Rep. of Germany .......... 172/4 |
| 2701117 | 7/1978 | Fed. Rep. of Germany ....... 56/10.2 |
| 2343412 | 10/1977 | France ..................................... 172/4 |
| 46627 | 3/1963 | Poland ..................................... 172/4 |
| 144729 | 3/1962 | U.S.S.R. ................................... 172/4 |

Primary Examiner—Richard T. Stouffer
Attorney, Agent, or Firm—Zalkind & Shuster

[57] ABSTRACT

An improvement in apparatus for lifting an agricultural implement carried by a tractor provides for automatic rapid level adjustment of the implement relative to the terrain under control of a valve system which comprises a regulator valve controlling inlet flow to the pump responsive to a comparator valve carried by the implement. A continuous throtted flow from the regulating valve to the comparator valve is maintained at constant pressure tending to open a valve in the comparator while a sensor or feeler contacting the ground serves to effect a greater or lesser opposing force. A servo valve is provided which effects a back pressure acting together with feeler actuation. An equilibrium position of the valve determines the level to which the implement is changed, holding it constant on level ground until the feeler is actuated by encountering a rise or fall in the terrain. The construction provides for varying the elevation of an implement by either raising it or lowering it to meet rise or fall of terrain.

16 Claims, 3 Drawing Figures

HYDRAULIC LIFTING ARRANGEMENT FOR IMPLEMENTS, ESPECIALLY ON TRACTORS

STATUS OF THE PRIOR ART

Apparatus for lifting agricultural implements have been long known, for example, as seen in German Pat. No. 968 218. In the German patent the apparatus requires a standard control valve and an additional control valve, both piston type or spool valves, operable and responsive to a feeler wheel on a carrying tractor. In the arrangement, the relative movement of the feeler wheel moving over the terrain is transferred to one of the spool valves relative to the existing position of the implement as supported by the hydraulic system at that time. Thus, the working depth of the implement is adjusted independently of the position of the standard valve. The pump which feeds the power cylinder is necessarily always under pressure requiring relatively high power expenditure and undesirable heating of circulating oil. With the feeler wheel fastened integrally to the implement via the additional spool valve, there is the further disadvantage that three flow conduits are required which must be coupled and uncoupled to the standard valve when the implement is removed from the tractor.

German DE-AS No. 15 82 161 (FIG. 3) shows an additional feeler control for lifting a harvester implement in which there is a feeler mounted on a swivel axis on each side of the moving implement. These feelers are connected mechanically through a complex system to an end of a transfer lever, the other end of which is actuatably responsive to the pressure in a power cylinder. The apparatus also has a rod system for position control of the mowing level which also acts on the transfer lever. The element which is dependent on power cylinder pressure connects through a drag bar with a control device for the oil feed to the power cylinder.

The above apparatus may also be operated manually, in which case adjustment of the implement level for mowing is dependent on the pressure in the power cylinder and the element responsive thereto. In such control systems, the actuating motion of the feelers is transferred by Bowden cables and the systems are subject to dirt and wear and operate with a relatively high friction. The needed sensitivity of the control arrangement is not certain. Additionally, the apparatus is relatively expensive to manufacture. FIG. 5 of the above German publication uses an electric switching circuit as an equivalent of the mechanical control rod system serving as a transfer means to control the apparatus for effecting level change of the implement. Such electrical systems are prone to breakdown and not suited for rough driving conditions in the practical operation of agricultural tractors.

German Pat. No. 10 00 624 shows an arrangement involving a piston pump having a variable capacity by change of stroke. In the arrangement, the pump has to be turned on and off for the different positions of the implement by means of a return mechanism which also effects holding the implement in a changed position without changing the oil pressure effected by the pump. Such arrangements of capacity control of pumps requirements are relatively expensive.

DESCRIPTION OF PRESENT INVENTION

The invention herein utilizes an apparatus by means of which the working level of an implement is constantly adjustable and effects rapid lifting of the implement as required. The construction is relatively simple and uses a minimum of power consumption.

In the improvement over the prior art as effected by the invention, inlet feed to the engine driven pump passes through a regulator valve which regulates such feed in response to sensing movement of a ground feeler and to the pressure in the power cylinder. Feed from the regulator valve going to a comparator valve on the implement under continuous flow has a pressure acting to open a valve in the comparator. Such valve is advantageously a simple ball valve, and it is held normally in an equilibrium position by a balance of opposed forces. Such forces are the continuous flow from the regulator valve in conjunction with a spring acting together to open the comparator valve ball as against a closing force acting to close it. Such closing force is effected by a spring in conjunction with a back pressure in a chamber downstream of the ball valve. A servo valve which is connected between such chamber and tank serves to effect the back pressure. The back pressure is variable by adjustment of the servovalve and is the controlling pressure to predetermine a working level of the implement.

Thus, the ball valve on the comparator is maintained in a position of equilibrium by equal and opposite forces respectively responsive to the pressure of incoming continuous flow as against back pressure in the downstream chamber, each in conjunction with a respective spring. An unbalance of such forces, which occurs should the feeler encounter a rise or fall in the terrain, acts on that spring which has a closing force on the ball valve, and effects a change in pump pressure prevailing in the power cylinder by initiating system operation. The result is the lifting or lowering of the implement to a working level predetermined by the then existing downstream chamber back pressure as determined by the servo valve.

The combination disclosed herein operates with lower power consumption and has the further advantage of simple servicing. Only two oil feed conduits of small diameter need be connected from the tractor cab to the comparator valve on the implement for the continuous flow from the regulator valve to the comparator. An additional high pressure conduit connects from the pump to the power cylinder which needs no disconnect when the implement is removed. Further, the comparator is relatively small and of compact construction and can be made simply and ruggedly.

BRIEF DESCRIPTION, REFERRING TO DRAWING

Briefly, in the main component arrangement of the invention, a regulator valve 6 connected at the intake of a pump 7 regulates the intake flow to the pump. The regulator valve feeds a comparator valve 17 carried by the agricultural implement 3 with a continuous flow having a pressure force through a bore 40 in the comparator valve which, in conjunction with a spring 50, tends to open a valve ball 36 normally held in an equilibrium position against a closing pressure in a chamber 48 acting in conjunction with a spring 46, all in the comparator valve 17. The pressure in chamber 48 is effected by a back pressure means, servo valve 14, through which the continuous flow from the regulator valve 6 feeds to a tank 8. A ground contacting feeler 18 responsive to rise and fall of ground surface acts on spring 46 to vary the valve closing force of the spring either by increasing or decreasing its initial compression. Compression is increased for a rise in the ground and decreased for a fall in the ground. This produces a movement of the valve ball 36 in opening or closing direction to vary the pressure in a chamber 31 at the upper end of the housing of regulator valve 6. The regulator valve has a reciprocal piston 21 acted on in opposite directions by the pressure in chamber 31 plus a spring 25 as against the pressure in power cylinder 4 connecting to the regulator valve below piston 21. The movement of piston 21 is then responsive to a rise or fall of ground as scanned by the feeler 18 and serves to vary the flow pressure to comparator valve 17 to return valve 36 to normal level ground position of the implement. Such movement of piston 21 also at the same time varies intake feed to pump 7 to vary the pressure in the power cylinder 4 to raise or lower the implement 3.

The valve ball 36 is thus maintained in equilibrium position by a balance of opposed force thereon for level ground traverse when feeler 18 encounters no rise or fall of the ground. The continuous current flow is maintained at constant pressure until a change in pressure caused by movement of feeler 18 acting on spring 46 causes a pressure change in bore 40 acting on valve ball 36 in the opening or closing direction whence the system is actuated by pressure in chamber 31 to vary the pressure in the power cylinder by operation of piston 21, causing implement 3 to follow the ground level variation.

DETAILED DESCRIPTION

A detailed description of the invention now follows in conjunction with the appended drawing, in which.

Figure 1:
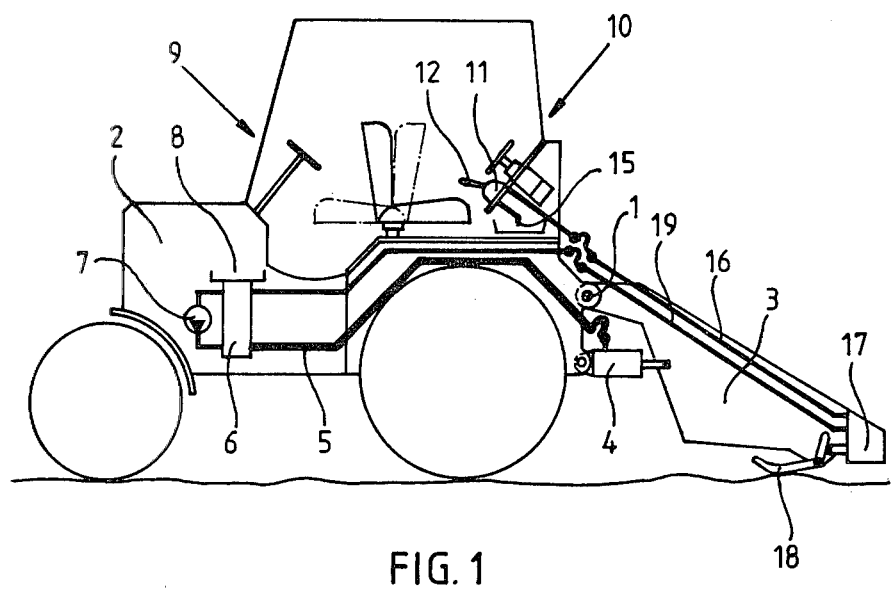
FIG. 1 is a schematic presentation of an agricultural tractor having an implement which may be a cultivator or mower pivotally carried thereby, showing various major components which are comprised in the invention.
Figure 2:
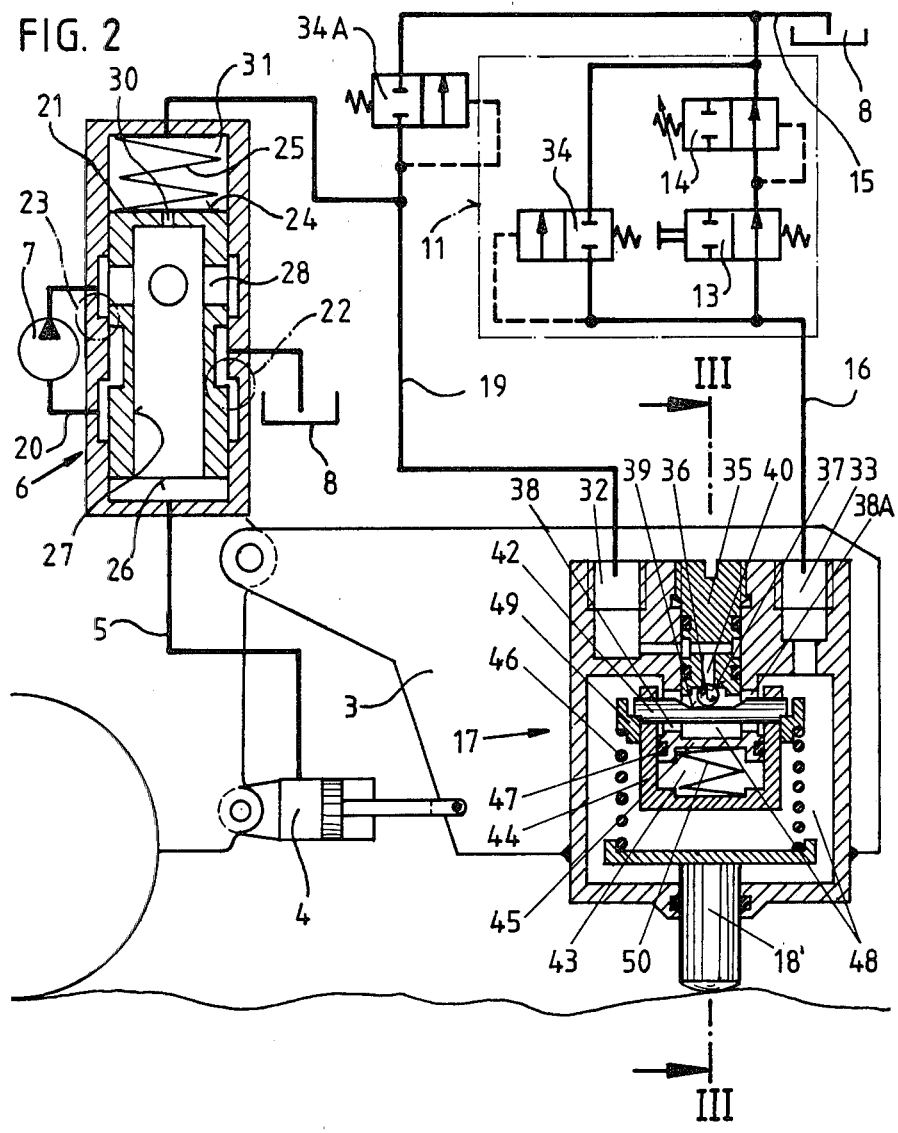
FIG. 2 is a diagrammatic presentation of certain components in cross section with symbolic presentation of certain of the valving components of the invention, in conjunction with a single acting hydraulic power cylinder and ground feeler mechanism.

Referring to FIG. 1, the ground working implement 3 is shown hingedly carried on the hinge 1 of a tractor 2. the implement is operated by the single acting hydraulic power lifting cylinder 4 connected to high pressure pump 7 by way of pressure conduit 5 and pressure regulator valve 6. Pump 7 is driven in a conventional manner by the tractor engine to feed pressure oil from tank 8 to regulator valve 6. The tank 8 is shown in duplicate in FIG. 2 for simplicity in illustrating connecting conduits for pump feed and system exhaust. Control stations 9, 10 within the cab of the tractor are provided for respective directions of travel of the tractor. At the control station 10, there is a multi-valve arrangement or control device 11 with a manual lever 12 for selective operation of the implement 3 to an upper terminal position. Such control device 11 contains a lifting control valve 13 (FIG. 2) operated by lever 12, a system maximum pressure limiting valve 34A, a servo valve 14 which is adjusted for predetermined level of the implement 3 at some particular point in coaction with a comparator valve 17, and a pressure limiting valve 34 for servo valve 14. An oil flow return conduit connects the control device 11 with tank 8. The control system 11 connects via a conduit 16 through port 33 with the comparator valve 17 carried by the implement 3, a pressurizing control conduit. Similarly, the regulator valve 6, which is a manometer type of piston valve operated by differential pressures, connects with the comparator valve 17 via an additional conduit 19 and port 32. Sensing means comprising a level feeler 18, for example, a shoe or runner which senses ground rise and fall, as seen in FIG. 1, mechanically operates the comparator valve 17 through a plunger 18 (FIG. 2). For clarity of illustration, the scanning shoe has been eliminated in FIG. 2 and a plunger 18 is shown as simply engaging the ground to be actuated by rises and falls of the terrain, as will be readily understood from FIG. 2. Thus, the regulator valve 6 acting as a differentially operated piston has a housing connected to inlet conduit 20 of the pump 7 and also connected for flow to a tank 8. A pressure flow conduit 5 connects from the single acting cylinder 4 to one end of that housing which has a slidable pressure operated hollow piston 21 therein reciprocally dependent upon differential pressures on its faces. Regulator valve 6 passes a flow which is operating except when pump intake is cut off, and such flow is varied in pressure to control the regulator valve in response to ground level variation. Coacting control edges of the piston 21 and the housing, such as flow control edges 22 and 23, control flow upon shifting of the piston. The piston is cup shaped and the upper outer face 24 of the top of the piston is biased by a spring 25 acting against the housing and inner top surface, whereas the lower inner face and bottom edge constitutes an opposite composite face 26 in communication through the axial hollow bore 27 of the piston with the conduit 5 for pressure to be exerted on such lower face 26 from the implement lifting cylinder 4. Also, the bore 27 communicates with the outlet or pressure side of pump 7 through transverse bores 28 passing radially through the piston wall, as shown. The working faces 24 and 26 of the piston are connected via a throttle means such as bore 30 in the otherwise closed upper end of the piston. The conduit 19 communicates with a pressure chamber 31 of regulator valve 6 at the downstream side of throttle 30, spring 25 being in that chamber.

Comparator valve 17 carried by the implement 3 comprises a housing having the ports 32 and 33 for conduit 19 and conduit 16, respectively. Port 33 connects conduit 16 to the multivalve control device 11, specifically to valves 13 and 14 in series, and to valve 34 on their upstream sides. Valves 14 and 34 connect downstream to tank 8. By means of servo valve 14, which is adjustable for spring pressure, within the control device 11, a back pressure may be selected in conduit 16 and thus in chamber 48 of the comparator valve 17 to determine control levels, that is, the level relative to ground to which the implement 3 will adjust upon actuation of plunger 18'. The servo valve may be simply a ball valve biased towards closure by a spring having selectively adjustable compression. The lift control valve 13 is series connected upstream of the servo valve 14 stated as a means effecting back pressure in comparator valve 17. As indicated by the arrows, valves 13 and 14 are upstream of comparator valve 17. Valve 13 is controlled by the vehicle operator utilizing the lever 12 to cut off flow to servo valve 14 so as to optionally lift the implement. Pressure limiting valve 34A branches off from conduit 19 and is set to permit a certain predetermined maximum value in that conduit 19. The pressure limiting valve 34, on the other hand, limits the pressure passing to the servo valve 14 coming from conduit 16. As seen on FIG. 2, the limiting valves connect downstream to tank 8 to receive relief flow.

Comparator valve 17 as shown in FIG. 2 comprises a housing effecting pressure chamber 48 in which the back pressure is maintained due to the downstream servo valve 14. A plug insert 35 is fixedly carried by the housing and sealed in a bore therein to provide passageways into the housing and also to comprise a valve means such as a ball valve seat 37 to coact with the ball valve 36. A bore 40 in plug 35 communicates through the valve seat 37 with the upstream side of the ball valve 36. Bore 40 communicates with the conduit 19 leading back to the regulator valve 6 through the port 32. The ball valve 36 is normally maintained in an equilibrium position by opposing forces to permit flow therethrough into chamber 48 of the comparator valve. Such flow comes through throttle bore 30 at a predetermined rate.

Figure 3:
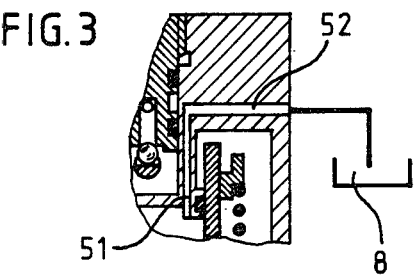
FIG. 3 is a fragmentary section on the line III—III of FIG. 2.

The comparator valve 17 is provided with an inwardly extending integral skirt 45 encompassed sealingly by a support means for the ball valve comprising a reciprocal cup 44 which carries a cross pin 42 carried at its ends in side openings 38 and 38A of cup 44 which are axially elongated so that pin 42 can shift upwardly or downwardly. The pin 42 is provided with a side recess 39 which holds the ball valve 36. It will be noted that this support means for ball valve 36 is downstream of the ball valve. A pressure relief chamber 43 in cup 44 is provided which is isolated from the pressure chamber 48 by a gasket 47 surrounding the housing skirt 45 and engaging the interior of relief chamber 43. As will be noted in FIG. 3, relief of oil from chamber 43 is through an axial bore 51 in the housing connecting with a radial bore 52 therein an thus to tank 8. A spring 50 is contained in relief chamber 43 which, acting against the bottom of cup 44 and against the end of plug 35 biases the cup 44 downwardly in the opening direction of ball valve 36.

For simplicity of illustration, as hereinabove noted, the vertical position of the feeler 18 as seen in FIG. 2 is in the form of a vertical plunger. Such position is determined by the position of the cup 44 through a spring 46 in chamber 48 acting compressibly against a spring plate 49 abutting pin 42 carried by cup 44 and thus reacting agaist the plunger via the plate shown in FIG. 2 as attached to the plunger. Accordingly, ball valve 36 is biased towards closing by the transverse pin 42 acted upon by spring 46, and biased toward opening by the spring 50 acting against the bottom of the cup 44. However, the opposing spring forces act in conjunction with opposing respective pressure forces, as will be explained.

Pressure oil downstream of valve 36, in chamber 48, is via conduit 16 as a back pressure due to servo valve 14 and is a further force acting on cup 44 in the closing direction of ball valve 36. This net closing pressure force is due to the differential area of the cup exposed in chamber 48 as against the area isolated from such pressure by the gasket 39 of plug insert 35. The setting of servo valve 14 causes a back pressure in conduit 16 and thus in chamber 48 which effects such closing force. On the other hand, the pressure in bore 40 acts as an opening force on the ball valve. Thus, the balancing of a combined spring and respective pressure forces opposed on each side of the ball valve effect an equilibrium position permitting a continuous flow at constant pressure with the implement 3 at a fixed level until an unbalance is effected by actuation of plunger 18 to increase or decrease the initial compression in spring 46.

OPERATION

FIG. 2 shows the relative positions of the components when the implement 3 is moving over level ground at a fixed height relative thereto.

The height is held constant by the comparator valve 17 as influenced by back pressure in chamber 48 due to the servo valve 14. The ball valve 36 is balanced between equal and opposite forces at a predetermined position permitting continuous requlated flow through the comparator valve 17 at the particular pressure determined by the servo valve 14. Thus, as seen in FIG. 2, comparator valve 17 is ready for actuation. There is low through throttle 30 and conduit 19 to bore 40 past ball valve 36. Conduit 16 connects chamber 48 with servo valve 14 which is set for a selected back pressure in that chamber, and thence to tank 8. Implement 3 is operating at the level selected by the selected loading of the servo valve spring.

Should the plunger 18' encounter a rise in the ground, the compression in spring 46 is obviously increased. Such increase in spring compression coupled with the existing pressure determined by the servo valve, which prevails in the chamber 48, both of which are forces exerted on cup 44, actuate ball valve 36 upwardly towards seat 37 against the compression in spring 50 and against the incoming pressure in the bore 40 acting in the opposite direction to open the ball valve. The equilibrium position is disturbed as the closing force effected by the increased compression in spring 46 dominates. Accordingly, pump 7 now operates at greater pressure because of the rise in pressure in bore 40 now due to the restricting or flow therethrough as valve ball 36 moves toward closure. Therefore, a greater pressure occurs in bore 40 against the ball valve 36 to keep it open, which pressure overcomes the sum of the forces acting to close it. However, due to the movement of the ball valve toward closure, the pressure in the conduit 19 as felt in the chamber 31 of regulator valve 6 increases. Such increase of pressure in chamber 31 is exerted on the upper face 24 of piston 21 and coupled with the force of spring 25 shifts the piston downward. Accordingly, the flow area at the control edges 22 is increased whence a higher discharge rate from pump 7 passes through the transverse bores 28, axial bore 27, conduit 5, to the power cylinder 5. Thus, the power cylinder is increasingly pressurized and the implement 3 is elevated to a suitable level. This new leveling of implement 3 is completed when the combined force of spring 50 and the pressure through throttle bore 30 via conduit 19 into bore 40 effects an opening force on ball valve 36 that balances the combined force acting in the closing direction due to the pressure in chamber 48 and the spring 46. Meanwhile, pressure is being lowered in chamber 48 due to further opening of servo valve 14 and increased flow via conduit 16 to tank 8. Thus, the equilibrium position of valve ball 36 is restored.

When the feeler plunger 18' encounters an indentation in the ground, the compression in spring 46 is decreased and the sum of the forces of pressure in the chamber 48 coupled with the lessened force of spring 46, acting to close ball valve 36, is reduced. At that time, the pressure in bore 40 in conjunction with spring 50, accordingly, further opens ball valve 36 away from valve seat 37. Therefore, there is a drop in the pressure in chamber 31 of regulator valve 6 acting on piston 21. The pressure on upper face 24 of piston 21 is thus reduced relative to the pressure on lower face 26 which is pressure connected via conduit 5 to power cylinder 4. This unbalance of pressures shifts piston 21 in the upward direction due to the domination of the pressure in power cylinder 5. Accordingly, the flow control edges 22 are closed and subsequently the flow control edges 23 are slightly opened. A portion of the oil volume of the power cylinder 4 thus flows via the transverse bores 28 and the flow control edges 23 to the tank 8 until such time as spring 25 again forces piston 21 downward. Thus, the implement 3 has a new and lower level for operation when the forces acting on ball valve 36 again become balanced.

From the preceding it will be noted that the regulator valve 6 operates as a differential piston valve or manometer, in the manner of a flow limiting valve. Flow in conduit 19 is determined exactly by the differential pressure acting on the piston 21 in correlation with the flow area of the throttle bore 30. This system control flow in conduit 19 and the pump flow operating power cylinder 4 to effect lifting of implement 3 are regulated at the control edges 22 for the lifting of the implement 3 for flow from control valve 6 and regulation is at the control edges 23 when flow is from the power cylinder 4 to the control valve 6 for lowering the implement. This results in a considerable saving of energy.

By operation of the lifting control valve 13 as by lever 12 by the tractor operator return flow of oil through conduit 16 is blocked. Accordingly, a rise in pressure in bore 40 occurs from conduit 19 to a maximum value. At that time, the back pressure in chamber 48 via conduit 16 rises to a value limited by the pressure limiting valve 34. Thus, piston 21 of control valve 6 is forced downwardly to widely open control edges 22. A large volume of oil now flows from pump 7 into the power cylinder 4 until implement 3 reaches its upper terminal position. Simultaneously, the pressure in power cylinder 4 acting on the face 26 moves piston 21 upwardly and thus narrows the gap at control edges 22 to regulate the incoming flow area again by throttling pump inlet flow.

From the foreging it is apparent that the invention provides a system having relatively simple components wherein a valve means is provided with non-varying continuous flow for level ground, equilibrium of the valve means being dependent on a downstream back pressure which can be selectively varied to meet operating conditions and to determine the level at which an agricultural implement will move in response to a changing terrain.

I claim:

1. In an apparatus with an agricultural implement associated therewith, said apparatus being adapted for varying the elevation of the implement, said apparatus having a ground level sensing means carried by the implement, said apparatus having a pump (7) and a hydraulic power cylinder (4) and a control system:
the improvement comprising
a control system regulating valve (6) having flow control passage means (22, 23, 27, 28) for flow to the inlet of the pump and to and from the power cylinder;
a comparator valve (17) having valve means (36, 37) and having force balancing means (44, 46, 48, 40, 50) to maintain said valve means in an equilibrium position;
back pressure means (14) downstream of said valve means to effect a back pressure in said comparator valve operative on said force balancing means;
predetermining flow rate means (30) effecting a continuous flow at constant pressure from said pump through said regulator valve to said comparator valve and through said valve means when said valve means is an equilibrium position;
said force balancing means comprising an actuating means (46) responsive to said ground level sensing means to effect an unbalance of said forces responsive to a change in ground level to vary the opening of said valve means whereby the pressure of said continuous flow is varied;
and pressure responsive actuating means (24, 25, 26) in said regulator valve actuatable to direct flow through said flow control passage means to or from said power cylinder responsive to a variation in said continuous flow pressure for directing flow to or from said hydraulic power cylinder effecting raising or lowering said implement.

2. In an apparatus as set forth in claim 1, wherein said force balancing means comprises a member (35) having a pressure bore (40) through which said continuous low passes and acts against said valve means in the opening direction and including a first spring (50) acting in conjunction therewith to effect an opening force;
and wherein said force balancing means further comprises a member (44) exposed to a back pressure downstream of said valve means in said comparator valve effecting a closing force, said actuating means comprising a first spring (46) acting in conjunction therewith;
said ground level sensing means comprising a member acting against said last named spring (46);
said means for effecting a back pressure in said comparator valve comprising a spring loaded valve (14) disposed downstream of said valve means and through which said continuous flow passes.

3. In an apparatus as set forth in claim 2, wherein said valve means comprises a ball valve (36) and member (35) providing a valve seat (37) therefor;
said comparator valve (17) having a housing;
said member (44) comprising a cup slidably supported within said comparator valve housing and having a ball support element (42) engaging said valve ball on the downstream side thereof;
wherein said support element is biased to urge said ball valve toward said valve seat by said last named spring (46).

4. In an apparatus as set forth in claim 3, wherein said member (35) extends into said valve housing and is provided with passages for connection to said regulator valve for said continuous flow therefrom to said pressure bore (40);
said ball support element (42) comprising a pin extending across said cup and having ends extending therefrom;
a ring (49) slidable on said cup and engaging said ends of said pin;
said last named spring (46) engaging said ring whereby the closing force of said last named spring is transmitted to said ring and thence to said pin and thence to said valve ball (36).

5. In an apparatus as set forth in claim 4, wherein said comparator valve housing has a skirt extending thereinto and wherein said cup is sealingly slidable on said skirt;

said pin (42) extending through elongated slots (38, 38a) of said skirt;

said skirt having a spring support means (45) and said first spring (50) within said cup and supported against said spring support means and the end of said cup and disposed to exert a force on said cup in an opening direction of said ball valve (36).

6. In an apparatus as set forth in claim 5, including passage means (51, 52) in said skirt extending through said comparator valve housing for relief flow;

wherein the spring support means (45) is a closed bottom of said skirt and effects a chamber with the bottom of said cup for said first spring (50).

7. In an apparatus as set forth in claim 1, wherein said regulator valve comprises a housing having a pressure operated slidable piston (21) therein;

said piston having a bore (27) closed at one end except for a throttle bore (30) and open at the other end, said continuous flow being via said throttle bore to said force balancing means;

said regulator valve housing having means (5) at one end adjacent the open end of said piston for connection to said hydraulic power cylinder (4);

a pressure chamber (31) in said regulator valve housing between the other end of said housing and the throttle bore end of said piston wherein said continuous flow passes through said latter chamber (31)

a spring (25) in said latter chamber urging said piston in the direction of pressure actuation;

passage means (20, 23) for connecting said regulator valve housing, respectively to the inlet and to the outlet of said pump (7); coacting grooves within said latter housing and piston connecting to respective passage means and to exhaust means whereby the edges of said grooves effect valving gaps for opening or closing flow intermediate said pump, said hydraulic power cylinder and to said exhaust means, dependent upon the position of said piston in said regulator valve housing;

whereby when said ground level sensing means is forced upwardly to effect a closing force on said valve ball (36), a pressure increase in said force balancing means is effected acting in said regulator valve pressure chamber (31) in conjunction with the spring (25) therein to shift said piston (21) to increase flow from said pump;

and whereby when said ground level sensing means moves downwardly a drop in pressure occurs in said pressure balancing means thus reducing the pressure in said regulator valve chamber (31) whence the pressure in said hydraulic power cylinder shifts said regulator valve piston (21) in a direction to permit flow from said hydraulic power cylinder through one of said valving gaps to said exhaust means while closing the other of said valving gaps to stop inlet flow to said pump.

8. In an apparatus as set forth in claim 1, wherein said force balancing means comprises a member (35) having a pressure bore (40) through which said continuous flow passes;

said valve means having a valve ball (36) and a valve seat (37) wherein said pressure bore passes through said valve seat and has increased pressure when said valve ball moves toward said valve seat to effect an opening force on said valve ball, including a first spring (50) acting in conjunction therewith to effect an opening force;

wherein the pressure in said pressure bore is responsive to the proximity of said valve ball relative thereto;

and wherein said force balancing means further comprises a member (44) exposed to a back pressure downstream of said valve means in said comparator valve and acting as a force to close said valve means, said actuating means comprising a second spring (46) acting in conjunction therewith as a closing force;

said ground level sensing means comprising a member 18' acting against said last named spring (46);

said means for effecting a back pressure in said comparator valve comprising a spring loaded valve (14) disposed downstream of said valve means and through which said continuous flow passes;

wherein said regulator valve comprises a housing having a pressure operated slidable piston (21) therein;

said piston having a bore (27) closed at one end except for a throttle bore (30) and open at the other end;

said regulator valve housing having means (5) at one end adjacent the open end of said piston for connection to said hydraulic power cylinder (4);

a pressure chamber (31) being effected between the other end of said cylinder and said one end of said piston operative to exert a pressure force on said end when pressurized;

a third spring (25) in said latter chamber urging said piston in the direction of said pressure force;

passage means (20, 23) for connecting said regulator valve housing, respectively, to the inlet and to the outlet of said pump (7); coacting grooves within said latter housing and piston connecting to respective passage means and to exhaust means whereby the edges of said grooves effect valving gaps for opening or closing flow intermediate said pump, said hydraulic power cylinder and to said exhaust means, dependent upon the position of said piston in said regulator valve housing;

said pressure chamber (31) of said regulator valve communicating with the pressure bore (40) of said force balancing means whereby when said ground level sensing member is forced upwardly to effect said closing force on said valve ball (36), a pressure increase in said pressure bore (40) is effected acting in said regulator valve pressure chamber (31) in conjunction with the third spring (25) therein to shift said piston to increase flow to said pump;

and whereby when said ground level sensing member moves downwardly a drop in pressure occurs in said pressure bore (40) thus reducing the pressure in said regulator valve chamber (31) whence the pressure in said hydraulic power cylinder shifts said regulator valve piston (21) in a direction to permit flow from said hydraulic power cylinder through one of said valving gaps to said exhaust means while closing the other of said valving gaps to stop inlet flow to said pump.

9. In an apparatus with an agricultural implement associated therewith, said apparatus being adapted for varying elevation of said implement for use on agricultural tractors and responsive to rise and fall of ground over which the implement moves, wherein such apparatus comprises a high pressure pump (7), having an inlet (20) and an outlet and a hydraulic power cylinder (4), including a control system for said power cylinder, a ground feeler means associated with said power cylinder, said power cylinder being actuatable in response to actuation of said ground feeler means which is movable in ground contact while moving with said implement;

the improvement in said control system comprising:

a regulating valve (6) connected to control flow through the inlet (2) to said pump (7) and also connected to said power cylinder (4);

a comparator valve (17) carried by said implement and having a valve means (36, 37) and a connection (19) to said regulator valve whereby a continuous flow passes from said pump through said regulator valve and thence through said valve means;

said comparator valve (17) being operable by said ground feeler means and an actuating means (46) for effecting actuation of said valve means responsive to movement of said ground feeler means in ground contact;

said comparator valve having force balancing means (40, 50, 48) including said actuating means (46) operative to normally maintain an equilibrium position of said valve means when said feeler means is coursing level ground;

said regulator valve having means operative for power cylinder control responsive to actuation of said valve means effecting a change in pressure of said continuous flow, including control passages (22, 23) for controlling flow to or from said power cylinder dependent upon increase or decrease of said pressure;

back pressure means (14) downstream of said valve means through which said continuous flow passes for effecting a predetermined back pressure in said force balancing means operative as a closing force on said valve means;

said force balancing means effecting forces in opposite directions on said valve means normally balancing said valve means in an equilibrium position for a predetermined continuous flow condition dependent on a predetermined back pressure in said force balancing means;

wherein actuation of said actuating means (46) by said feeler means effects a force unbalance on said valve means to vary pressure therethrough effecting operation of said regulator valve to control flow to or from said power cylinder responsive to rise or fall of ground level, respectively, for varying the elevation of said implement accordingly;

said force balancing means being operative to restore equilibrium position of said valve means upon movement of said feeler means to the new level whereat said actuating means (46) is restored to initial condition.

10. In an apparatus as set forth in claim 9, wherein said back pressure means (14) comprises a valve, spring biased toward closure, and wherein the spring bias is selectively adjustable to effect a predetermined back pressure operative in said force balancing means.

11. In an apparatus as set forth in claim 10, including a valve (13) upstream of said back pressure valve (14) optionally operative to cut off flow therethrough for effecting operation of elements of said force balancing means rendering operative said regulator means to raise said implement to a terminal holding position.

12. In an apparatus as set forth in claim 10, including a pressure limiting valve (34) connected in parallel with said back pressure valve.

13. In a system with a ground level sensing means associated therewith, said sensing means being adapted for controlling a pump and hydraulic power cylinder to vary the elevation of an agricultural implement in response to said ground level sensing means;

the improvement which comprises:

a regulator valve means (6), a comparator valve means (17) connecting thereto, and a back pressure control means (14) connecting to said comparator valve means;

said regulator valve means including means operative to effect a flow from a pump to said comparator valve means and to and from a hydraulic cylinder;

said comparator valve means having a valve member (36) conconnected to receive said flow and including means (40) upstream of said valve member whereby said flow is operative as a force on said valve member in the opening direction to pass said flow through said valve member to said back pressure means;

said back pressure means being operative to effect a back pressure in said comparator valve means;

said comparator valve means including means (44) operative in response to said back pressure in said comparator valve means to effect a force to oppose opening of said valve member;

said comparator valve means also including means (46) operative in response to said ground sensing means to effect a varying force on said valve member in response to sensing rise or fall of ground whereby said varying force effects a varying opening of said valve member to effect a variation in the flow pressure from said regulator valve means acting on said valve member;

said regulator valve means including a valve element (21) and means (24, 26) operative in response to said variation of flow pressure for actuating said valve element to control pump flow through said regulator valve means to or from said hydraulic power cylinder for lifting or lowering an implement responsive to sensing of variation in ground level and to shut off said flow to said valve member when flow is from said hydraulic power cylinder to said regulator valve means.

14. In a system as set forth in claim 13, wherein said valve element (21) comprises a pressure operated piston valve and actuating means comprising pressure receiving surfaces (24, 26) and having one end closed except for a throttle bore (30) and having a substantially open end wherein said flow to said valve member (36) passes through said throttle bore and said open end communicates with said hydraulic power cylinder;

said regulator valve means having a housing in which said pressure operated piston is movable, and further including coacting passages and grooves in said housing and in said pressure operated piston for flow therethrough in communication with the inlet and outlet of a pump and a tank;

whereby variation in flow pressure acts on said piston valve to effect actuation for controlling flow to or from said hydraulic power cylinder and a tank.

15. In a system as set forth in claim 13, wherein said means upstream of said valve member whereby said flow is operative as a force comprises a member (35) having a pressure bore (40) and a valve seat (37) for said valve member (36); said pressure bore effecting a passage through said valve seat coacting with said valve member whereby the position of said valve member relative thereto effects variation of pressure in said pressure bore.

16. In a system for controlling a pump as set forth in claim 13, wherein said means included in said comparator valve means upstream of said valve member comprises a pressure bore (40) wherein a pressure therein is effected responsive to the proximity of said valve member thereto;

said comparator valve means having a spring (46) and means operative through said spring in response to a sensing means for effecting a closing force on said valve member;

said comparator valve means having another spring (50) and means therefore acting in an opposing direction to the force of said first mentioned spring (46) to effect an opening force on said valve;

wherein said means (44) operative in response to back pressure acts in conjunction with said first mentioned spring (46) to effect a closing force and the pressure in said pressure bore (40) acts in conjunction with said second mentioned spring (46) to effect an opening force;

whereby said valve member is maintained in a position of equilibrium when an implement is operating on level ground and passes said flow to said back pressure means.

* * * * *